United States Patent
Washio (10) Patent No.: US 10,753,471 B2
(45) Date of Patent: Aug. 25, 2020

(54) CONTROL APPARATUS FOR VEHICLE DRIVE-FORCE TRANSMITTING APPARATUS

(71) Applicant: TOYOTA JIDOSHA KABUSHIKI KAISHA, Toyota-shi, Aichi (JP)

(72) Inventor: Taichi Washio, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 41 days.

(21) Appl. No.: 16/238,885

(22) Filed: Jan. 3, 2019

(65) Prior Publication Data
US 2019/0234515 A1 Aug. 1, 2019

(30) Foreign Application Priority Data
Jan. 29, 2018 (JP) ................... 2018-013087

(51) Int. Cl.
*B60W 10/107* (2012.01)
*F16H 61/662* (2006.01)
(Continued)

(52) U.S. Cl.
CPC ......... *F16H 61/66236* (2013.01); *F16H 9/18* (2013.01); *F16H 37/0846* (2013.01); *B60W 10/107* (2013.01); *B60W 50/0225* (2013.01); *B60W 2520/10* (2013.01); *B60W 2710/1005* (2013.01); *F16H 59/40* (2013.01);
(Continued)

(58) Field of Classification Search
CPC ........... B60W 10/107; B60W 50/0225; B60W 2520/10; B60W 2710/1005; Y10T 477/6237; F16H 61/66236; F16H 37/0846; F16H 59/44; F16H 59/40; F16H 59/42;
(Continued)

(56) References Cited

U.S. PATENT DOCUMENTS

2013/0150208 A1* 6/2013 Wakayama ........... B60W 10/06
477/68
2014/0019021 A1* 1/2014 Yanagida ............ B60W 10/107
701/54
(Continued)

FOREIGN PATENT DOCUMENTS

| EP | 1818575 A2 * | 8/2007 | ....... F16H 61/66259 |
| JP | 2015105708 A | 6/2015 | |
| JP | 2016-023716 A | 2/2016 | |

*Primary Examiner* — Roger L Pang
(74) *Attorney, Agent, or Firm* — Oliff PLC (57) ABSTRACT

A control apparatus for a vehicle drive-force transmitting apparatus that includes a gear mechanism and a continuously-variable transmission mechanism. The control apparatus determines whether there is a lower-gear-ratio setting request requesting a target gear ratio of the continuously-variable transmission mechanism to be set to a lower gear ratio that is lower than a highest gear ratio of the continuously-variable transmission mechanism. When it is determined that there is not a detection accuracy of a rotational speed of an output rotary member of the drive-force transmitting apparatus, the control apparatus sets the target gear ratio to the lower gear ratio if it is determined that there is the lower-gear-ratio setting request, and sets the target gear ratio to the highest gear ratio if it is determined that there is not the lower-gear-ratio setting request.

5 Claims, 3 Drawing Sheets

(51) Int. Cl.
*F16H 9/18* (2006.01)
*F16H 37/08* (2006.01)
*F16H 59/44* (2006.01)
*F16H 59/40* (2006.01)
*F16H 59/42* (2006.01)
*B60W 50/02* (2012.01)

(52) U.S. Cl.
CPC .............. *F16H 59/42* (2013.01); *F16H 59/44* (2013.01); *F16H 2037/0866* (2013.01); *F16H 2059/446* (2013.01); *Y10T 477/6237* (2015.01)

(58) Field of Classification Search
CPC ....... F16H 2059/446; F16H 2037/0866; F16H 37/022
USPC .............................. 701/60, 63; 475/208, 210
See application file for complete search history.

(56) References Cited

U.S. PATENT DOCUMENTS

| | | | |
|---|---|---|---|
| 2016/0131255 A1* | 5/2016 | Taninaka | F16H 37/022 477/115 |
| 2019/0195360 A1* | 6/2019 | Washio | F16H 37/021 |
| 2019/0249774 A1* | 8/2019 | Ikeda | F16H 61/662 |

* cited by examiner

| DETECTION ACCURACY OF OUTPUT-SHAFT ROTATIONAL SPEED | DETECTION ACCURACY OF SECONDARY ROTATIONAL SPEED | SETTING OF TARGET GEAR RATIO | FB CONTROL FOR CVT SHIFTING |
|---|---|---|---|
| YES | YES | (TARGET INPUT-SHAFT ROTATIONAL SPEED) / (ACTUAL OUTPUT-SHAFT ROTATIONAL SPEED) | EXECUTED |
| YES | NO | | SUSPENDED |
| NO | YES | HIGHEST GEAR RATIO (FIXED VALUE) OR RATIO (OTHER THAN HIGHEST GEAR RATIO) IN ACCORDANCE WITH HARD PROTECTION REQUEST | EXECUTED |
| NO | NO | HIGHEST GEAR RATIO (FIXED VALUE) | SUSPENDED |

CONTROL APPARATUS FOR VEHICLE DRIVE-FORCE TRANSMITTING APPARATUS

This application claims priority from Japanese Patent Application No. 2018-013087 filed on Jan. 29, 2018, the disclosure of which is herein incorporated by reference in its entirety.

FIELD OF THE INVENTION

The present invention relates to a control apparatus for a drive-force transmitting apparatus that is to be provided in a vehicle, wherein the drive-force transmitting apparatus has a plurality of drive-force transmitting paths that are provided in parallel with each other between a drive force source and drive wheels of the vehicle.

BACKGROUND OF THE INVENTION

There is known a control apparatus for a drive-force transmitting apparatus that is to be provided in a vehicle having a drive force source and drive wheels, wherein the drive-force transmitting apparatus includes: an input rotary member to which a drive force is to be transmitted from the drive force source; an output rotary member from which the drive force is to be outputted to the drive wheels; a gear mechanism configured to provide at least one gear ratio; and a continuously-variable transmission mechanism including a primary pulley, a secondary pulley, and a transfer element that is looped over the primary and secondary pulleys, wherein the drive-force transmitting apparatus defines a plurality of drive-force transmitting paths that are provided in parallel with each other between the input rotary member and the output rotary member, wherein the plurality of drive-force transmitting paths include a first drive-force transmitting path through which the drive force is to be transmitted by the gear mechanism when the first drive-force transmitting path is established by engagement of a first engagement device provided in the first drive-force transmitting path, and wherein the plurality of drive-force transmitting paths include a second drive-force transmitting path through which the drive force is to be transmitted by the continuously-variable transmission mechanism when the second drive-force transmitting path is established by engagement of a second engagement device that is disposed between the continuously-variable transmission mechanism and the drive wheels in the second drive-force transmitting path. JP-2016-23716A discloses such an control apparatus for a drive-force transmitting apparatus that is to be provided in a vehicle, wherein the drive-force transmitting apparatus defines first and second drive-force transmitting paths, and includes a gear mechanism and a continuously-variable transmission mechanism that are provided in parallel with each other. This Japanese Patent Application Publication teaches that, during running of the vehicle in a state in which the second drive-force transmitting path is established with the first drive-force transmitting path being cut off, the second engagement device is released to cut off a part of the second drive-force transmitting path which is between the continuously-variable transmission mechanism and the drive wheels, when the vehicle is about to be stopped. Then, when an operator of the vehicle operates to stop an engine after the vehicle has been stopped, if a gear ratio of the continuously-variable transmission mechanism is not a highest gear ratio, the engine is not stopped until the gear ratio becomes the highest gear ratio, and the continuously-variable transmission mechanism is driven by the engine.

It is noted that the term "gear ratio" is defined as "rotational speed of input-side rotary member/rotational speed of output-side rotary member". For example, the gear ratio of the above-described drive-force transmitting apparatus is defined as "rotational speed of the input rotary member/rotational speed of the output rotary member", and the gear ratio of the above-described continuously-variable transmission is defined as "rotational speed of the primary pulley/rotational speed of the secondary pulley". A vehicle running speed could be lower as the gear ratio is higher, and could be higher as the gear ratio is lower. The above-described highest gear ratio of the continuously-variable transmission mechanism can be expressed also as a lowest-speed gear ratio.

SUMMARY OF THE INVENTION

By the way, in a running stop state or other state in which an accuracy of detecting a rotational speed of the output rotary member is not assured, it might be possible to always set a target gear ratio of the continuously-variable transmission mechanism to the highest gear ratio. However, there is a case in which the setting of the target ratio to the highest gear ratio is not appropriate depending on a situation of the vehicle. The gear ratio of the continuously-variable transmission mechanism can be caused to become the highest gear ratio, by reducing a thrust applied to the primary pulley and controlling a thrust applied to the secondary pulley in a manner that assures establishment of the highest gear ratio in the continuously-variable transmission mechanism. In this instance, however, in the event of a failure that maximizes the thrust applied to the secondary pulley, the transfer element could be clamped by an excessively increased clamping force although the highest gear ratio could be established in the continuously-variable transmission mechanism, so that a durability of the continuously-variable transmission mechanism could be reduced.

The present invention was made in view of the background art described above. It is therefore an object of the present invention to provide a control apparatus for a vehicle drive-force transmitting apparatus, which is capable of restraining or avoiding reduction of durability of the continuously-variable transmission mechanism in a case in which the accuracy of detecting the rotational speed of the output rotary member is not assured.

The object indicated above is achieved according to the following aspects of the present invention.

According to a first aspect of the invention, there is provided a control apparatus for a drive-force transmitting apparatus that is to be provided in a vehicle having a drive force source and drive wheels. The drive-force transmitting apparatus includes: an input rotary member to which a drive force is to be transmitted from the drive force source; an output rotary member from which the drive force is to be outputted to the drive wheels; a gear mechanism configured to provide at least one gear ratio; and a continuously-variable transmission mechanism including a primary pulley, a secondary pulley, and a transfer element that is looped over the primary and secondary pulleys. The drive-force transmitting apparatus defines a plurality of drive-force transmitting paths that are provided in parallel with each other between the input rotary member and the output rotary member. The plurality of drive-force transmitting paths include a first drive-force transmitting path through which the drive force is to be transmitted by the gear mechanism when the first drive-force transmitting path is established by a first engagement device which is provided in the first drive-force transmitting path. The plurality of drive-force transmitting paths include a second drive-force transmitting path through which the drive force is to be transmitted by the continuously-variable transmission mechanism when the second drive-force transmitting path is established by a second engagement device which is provided in the second drive-force transmitting path and which is disposed between the continuously-variable transmission mechanism and the output rotary member in the second drive-force transmitting path. The control apparatus comprises: an accuracy determining portion configured to determine whether there is an accuracy of detection of a rotational speed of the output rotary member or not; a request determining portion configured to determine whether there is a lower-gear-ratio setting request requesting a target gear ratio of the continuously-variable transmission mechanism to be set to a lower gear ratio that is lower than a highest gear ratio of the continuously-variable transmission mechanism, for example, for restraining or avoiding reduction of durability of the continuously-variable transmission mechanism; and a transmission shifting control portion configured, when the accuracy determining portion determines that there is not the accuracy of detection of the rotational speed of the output rotary member, to set the target gear ratio of the continuously-variable transmission mechanism to the lower gear ratio if the request determining portion determines that there is the lower-gear-ratio setting request, and to set the target gear ratio of the continuously-variable transmission mechanism to the highest gear ratio if the request determining portion determines that there is not the lower-gear-ratio setting request.

According to a second aspect of the invention, in the control apparatus according to the first aspect of the invention, the accuracy determining portion determines whether there is the accuracy of detection of the rotational speed of the output rotary member, by determining whether the vehicle is being substantially stopped or not, such that the accuracy determining portion determines that there is not the accuracy of detection of the rotational speed when determining that the vehicle is being substantially stopped.

According to a third aspect of the invention, in the control apparatus according to the second aspect of the invention, the transmission shifting control portion is configured, when the vehicle is being substantially stopped in a neutral state of the drive-force transmitting apparatus in which both of the first and second engagement devices are released, to set the target gear ratio of the continuously-variable transmission mechanism to the lower gear ratio if the request determining portion determines that there is the lower-gear-ratio setting request, and to set the target gear ratio of the continuously-variable transmission mechanism to the highest gear ratio if the request determining portion determines that there is not the lower-gear-ratio setting request.

According to a fourth aspect of the invention, in the control apparatus according to the third aspect of the invention, the transmission shifting control portion is configured to set the target gear ratio of the continuously-variable transmission mechanism to the highest gear ratio when the vehicle is being substantially stopped with one of the first and second drive-force transmitting paths being established by engagement of a corresponding one the first and second engagement devices.

According to a fifth aspect of the invention, in the control apparatus according to any one of the first through fourth aspects of the invention, the transmission shifting control portion is configured, when the accuracy determining portion determines that there is the accuracy of detection of the rotational speed of the output rotary member, to calculate the target gear ratio of the continuously-variable transmission mechanism based on an actual value of the rotational speed of the output rotary member and a target value of a rotational speed of the input rotary member.

According to a sixth aspect of the invention, in the control apparatus according to any one of the first through fifth aspects of the invention, the lower-gear-ratio setting request is for restraining or avoiding reduction of durability of the continuously-variable transmission mechanism.

In the control apparatus according to the first aspect of the invention, when it is determined that there is not the accuracy of detection of the rotational speed of the output rotary member, the target gear ratio of the continuously-variable transmission mechanism is set to the lower gear ratio that is lower than the highest gear ratio, if there is the lower-gear-ratio setting request that is, for example, for restraining or avoiding reduction of durability of the continuously-variable transmission mechanism. Thus, when the durability of the continuously-variable transmission mechanism could be reduced by causing the gear ratio of the continuously-variable transmission mechanism to become the highest gear ratio, the gear ratio of the continuously-variable transmission mechanism is not controlled to the highest gear ratio. It is therefore possible to restrain or avoid reduction of the durability of the continuously-variable transmission mechanism when the detection accuracy of the rotational speed of the output rotary member is not assured. Further, when it is determined that there is not the accuracy of detection of the rotational speed, the target gear ratio of the continuously-variable transmission mechanism is set to the highest gear ratio, if there is not the lower-gear-ratio setting request. Thus, when the target gear ratio cannot be calculated by using the rotational speed of the output rotary member, the gear ratio of the continuously-variable transmission mechanism is controlled to the highest gear ratio.

In the control apparatus according to the second aspect of the invention, the determination as to whether there is the accuracy of detection of the rotational speed of the output rotary member is made by determining whether the vehicle is being substantially stopped or not, such that it is determined that there is not the accuracy of detection of the rotational speed when the vehicle is being substantially stopped. It is therefore possible to restrain or avoid reduction of the durability of the continuously-variable transmission mechanism when the vehicle is being substantially stopped.

In the control apparatus according to the third aspect of the invention, when the vehicle is being substantially stopped in a neutral state of the drive-force transmitting apparatus, namely, in a state in which both of the first and second engagement devices are released, the target gear ratio of the continuously-variable transmission mechanism is set to the lower gear ratio that is lower than the highest gear ratio, if there is the lower-gear-ratio setting request that is, for example, for restraining or avoiding reduction of durability of the continuously-variable transmission mechanism. Thus, when the durability of the continuously-variable transmission mechanism could be reduced by causing the gear ratio of the continuously-variable transmission mechanism to become the highest gear ratio, the gear ratio of the continuously-variable transmission mechanism is not controlled to the highest gear ratio. It is therefore possible to restrain or avoid reduction of the durability of the continuously-variable transmission mechanism when the detection accuracy of the rotational speed of the output rotary member is not assured. Further, when the vehicle is being substantially stopped in the neutral state of the drive-force transmitting apparatus, the target gear ratio of the continuously-variable transmission mechanism is set to the highest gear ratio, if there is not the lower-gear-ratio setting request. Thus, when the target gear ratio cannot be calculated by using the rotational speed of the output rotary member, the gear ratio of the continuously-variable transmission mechanism is controlled to the highest gear ratio.

In the control apparatus according to the fourth aspect of the invention, when the vehicle is being substantially stopped with one of the first and second drive-force transmitting paths being established, the target gear ratio of the continuously-variable transmission mechanism is set to the highest gear ratio. That is, when the target gear ratio cannot be calculated by using the rotational speed of the output rotary member and a shifting action of the continuously-variable transmission mechanism cannot be executed, the target gear ratio is fixed to the highest gear ratio.

In the control apparatus according to the fifth aspect of the invention, when there is the accuracy of detection of the rotational speed of the output rotary member, the target gear ratio of the continuously-variable transmission mechanism is calculated based on an actual value of the rotational speed of the output rotary member and a target value of a rotational speed of the input rotary member, so that the target gear ratio is set to a value suitable for a running state of the vehicle.

In the control apparatus according to the sixth aspect of the invention, the lower-gear-ratio setting request is intended to restrain or avoid reduction of durability of the continuously-variable transmission mechanism. Thus, when the accuracy of detection of the rotational speed of the output rotary member is not assured, it is possible to restrain or avoid reduction of durability of the continuously-variable transmission mechanism.

DETAILED DESCRIPTION OF PREFERRED EMBODIMENT

In the embodiment of the present invention, each of the primary pulley (i.e., input-side pulley) and the secondary pulley (i.e., output-side pulley) includes, for example, a fixed sheave, a movable sheave and a hydraulic actuator, which is configured to apply a thrust for changing a width of an annular groove defined between the fixed and movable sheaves of a corresponding one of the primary and secondary pulleys. A vehicle provided with the above-described drive-force transmitting apparatus includes a hydraulic control unit configured to control pulley hydraulic pressures supplied as working hydraulic pressures to the respective hydraulic actuators, independently of each other. The hydraulic control unit may be configured to control an amount of flow of a working fluid supplied to each of the hydraulic actuators so as to consequently generate the pulley hydraulic pressures, for example. A shifting control operation is performed by the hydraulic control unit to execute a shifting action to establish a target gear ratio while preventing slippage of a transfer element in the continuously-variable transmission mechanism, by controlling the thrust (=pulley hydraulic pressure*pressure receiving area) applied to each of the primary and secondary pulleys. The transfer element, which is looped over the primary and secondary pulleys, may be a compression-type endless annular transmission belt including at least one endless annular hoop and a multiplicity of thick-plate-shaped block elements that are held by the at least one endless annular hoop so as to be arranged in their thickness direction corresponding to a circumferential direction of the transmission belt, along the at least one endless annular hoop, or alternatively, a tension-type belt constituting an endless annular link chain including a plurality of link plates alternately superposed and mutually connected at their end portions through connecting pins. The above-described continuously variable transmission mechanism is a known belt-type continuously-variable transmission, and can be broadly interpreted to conceptually encompass not only the belt-type continuously-variable transmission but also a chain-type continuously-variable transmission.

The above-described drive force source is, for example, an internal combustion engine such as a gasoline engine and a diesel engine generating a drive force by combustion of fuel supplied thereto. The vehicle may be equipped with, in addition to or in place of a drive force source in the form of the engine, another drive force source in the form of, for example, an electric motor.

Hereinafter, a preferred embodiment of the invention will be described in detail with reference to the accompanying drawings.

EMBODIMENT

Figure 1:
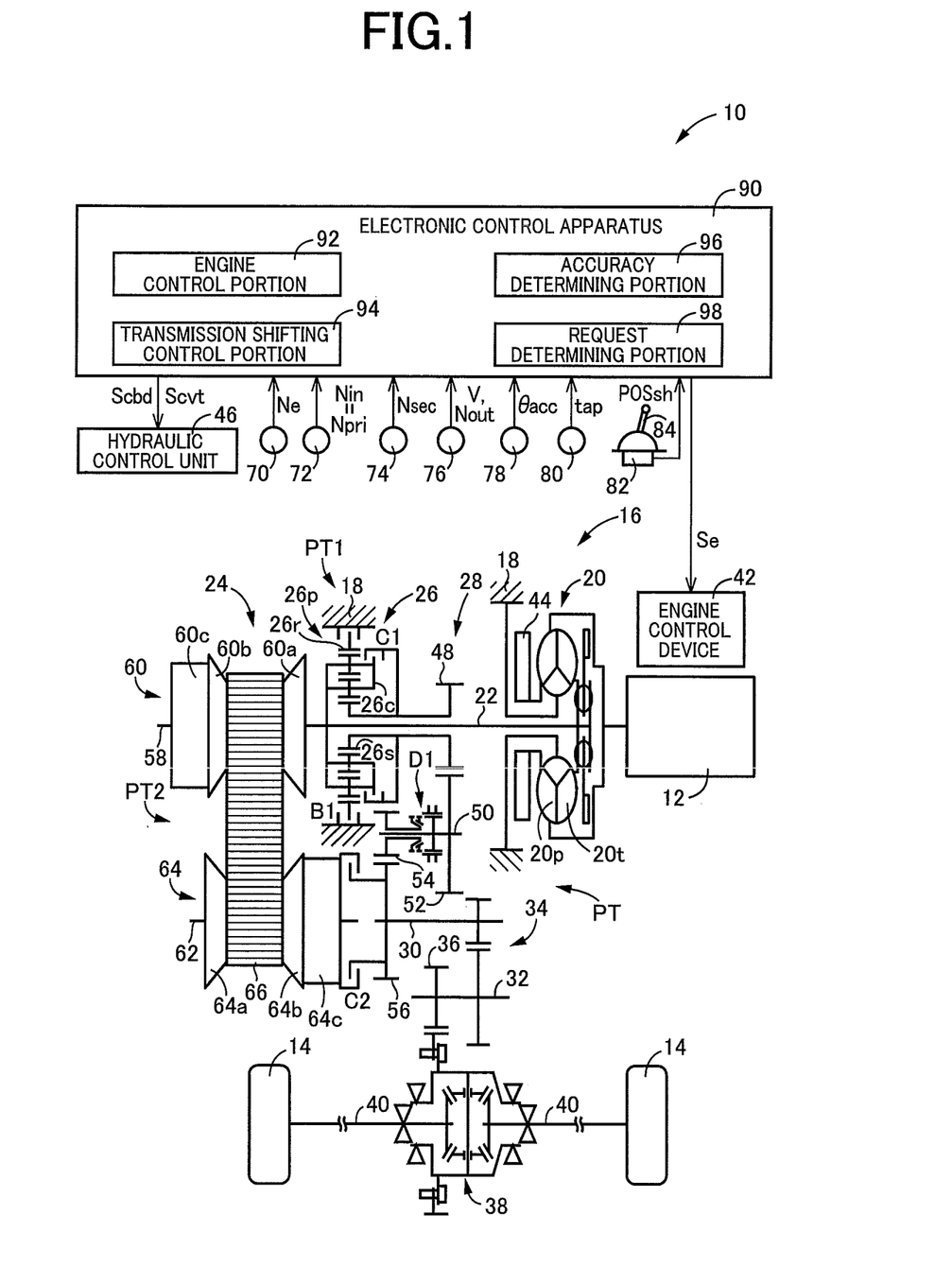
FIG. 1 is a schematic view showing a construction of a vehicle to be controlled by an electronic control apparatus according to the present invention, and major control functions and control portions of the control apparatus.

FIG. 1 is a schematic view showing a construction of a vehicle 10 to be controlled by a control apparatus according to the present invention, and major control functions and control portions of the control apparatus. As shown in FIG. 1, the vehicle 10 is provided with an engine 12 functioning as a drive force source configured to generate a drive force, drive wheels 14 and a drive-force transmitting apparatus 16 that is provided in drive-force transmitting paths between the engine 12 and the drive wheels 14.

The drive-force transmitting apparatus 16 includes a non-rotary member in the form of a casing 18, a fluid-operated type drive-force transmitting device in the form of a known torque converter 20 that is connected to the engine 12, an input shaft 22 connected to the torque converter 20, a continuously-variable transmission mechanism 24 connected to the input shaft 22, a forward/reverse switching device 26 connected to the input shaft 22, a gear mechanism 28 which is provided in parallel with the continuously-variable transmission mechanism 24 and which is connected to the input shaft 22 via the forward/reverse switching device 26, an output shaft 30 serving as an output rotary member that is common to the continuously-variable transmission mechanism 24 and the gear mechanism 28, a counter shaft 32, a reduction gear device 34 consisting of a pair of mutually meshing gears each of which is connected to a corresponding one of the output shaft 30 and the counter shaft 32 so as to unrotatable relative to the corresponding one of the shafts 30, 32, a gear 36 connected to the counter shaft 32 so as to be unrotatable relative to the counter shaft 32, and a differential gear device 38 connected to the gear 36. The torque converter 20, input shaft 22, continuously-variable transmission mechanism 24, forward/reverse switching device 26, gear mechanism 28, output shaft 30, counter shaft 32, reduction gear device 34, gear 36 and differential gear device 38 are disposed within the casing 18. The drive-force transmitting apparatus 16 further includes right and left axles 40 that are connected to the differential gear device 38. The input shaft 22 serves as an input rotary member to which the drive force of the engine 12 is to be inputted. The output shaft 30 serves as the output rotary member through which the drive force of the engine 12 is to be outputted. It is noted that the above-described drive force is synonymous with a drive torque or a drive power unless otherwise distinguished from them.

In the drive-force transmitting apparatus 16 constructed as described above, the drive force generated by the engine 12 is transmitted to the right and left drive wheels 14, via the torque converter 20, forward/reverse switching device 26, gear mechanism 28, reduction gear device 34, differential gear device 38, axles 40 and other elements, or alternatively, via the torque converter 20, continuously-variable transmission mechanism 24, reduction gear device 34, differential gear device 38, axles 40 and other elements.

As described above, the drive-force transmitting apparatus 16 has the gear mechanism 28 and the continuously-variable transmission mechanism 24 that are provided in parallel with each other in respective drive-force transmitting paths PT between the engine 12 and the drive wheels 14. Specifically, the drive-force transmitting apparatus 16 has the gear mechanism 28 and the continuously-variable transmission mechanism 24 that are provided in parallel with each other in the respective drive-force transmitting paths PT between the input shaft 22 and the output shaft 30. That is, the drive-force transmitting apparatus 16 defines the plurality of drive-force transmitting paths that are parallel with each other between the input shaft 22 and the output shaft 30, such that the drive force of the engine 12 is to be transmitted from the input shaft 22 to the output shaft 30 through a selected one of the drive-force transmitting paths PT. The plurality of drive-force transmitting paths PT consist of a first drive-force transmitting path PT1 constituted mainly by the gear mechanism 28 and a second drive-force transmitting path PT2 constituted mainly by the continuously-variable transmission mechanism 24. The first and second drive-force transmitting paths PT1, PT2 are defined in parallel with each other between the input shaft 22 and the output shaft 30. The first drive-force transmitting path PT1 is a path through which the drive force of the engine 12 is to be transmitted from the input shaft 22 toward the drive wheels 14 through the gear mechanism 28. The second drive-force transmitting path PT2 is a path through which the drive force of the engine 12 is to be transmitted from the input shaft 22 toward the drive wheels 14 through the continuously-variable transmission mechanism 24.

In the drive-force transmitting apparatus 16, the drive force of the engine 12 is transmitted toward the drive wheels 14 through a selected one of the first and second drive-force transmitting paths PT1, PT2, which is selected depending on a running state of the vehicle 10. To this end, the drive-force transmitting apparatus 16 includes a plurality of engagement devices by which the selected one of the first and second drive-force transmitting paths PT1, PT2 is established. The plurality of engagement devices include a first clutch C1, a first brake B1 and a second clutch C2. The first clutch C1, which serves as a first engagement device, is provided in the first drive-force transmitting path PT1 and configured to selectively connect and disconnect the first drive-force transmitting path PT1, such that the first drive-force transmitting path PT1 is established with engagement of the first clutch C1 during forward running of the vehicle 10. The first brake B1, which serves as a first engagement device, is provided in the first drive-force transmitting path PT1 and configured to selectively connect and disconnect the first drive-force transmitting path PT1, such that the first drive-force transmitting path PT1 is established with engagement of the first brake B1 during reverse running of the vehicle 10. That is, the first drive-force transmitting path PT1 is established with either the first clutch C1 or the first brake B1 being engaged. The second clutch C2, which serves as a second engagement device, is disposed in the second drive-force transmitting path PT2 and configured to selectively connect and disconnect the second drive-force transmitting path PT2, such that the second drive-force transmitting path PT2 is established with engagement of the second clutch C2. That is, the second drive-force transmitting path PT2 is established with the second clutch C2 being engaged. Each of the first clutch C1, first brake B1 and second clutch C2 is a known hydraulically-operated wet-type frictional engagement device that is to be frictionally engaged by operation of a hydraulic actuator. As described below, each of the first clutch C1 and the first brake B1 constitutes a part of the forward/reverse switching device 26.

The engine 12 is provided with an engine control device 42 including an electronic throttle device, a fuel injection device, an ignition device and other devices that are required for controlling an output of the engine 12. In the engine 12, the engine control device 42 is controlled, by an electronic control apparatus 90 (that corresponds to a control apparatus recited in the appended claims), based on an operation amount θacc of an accelerator pedal that corresponds to a required drive force of the vehicle 10 required by an operator of the vehicle 10, whereby an engine torque Te of the engine 12 is controlled.

The torque converter 20 is provided with a pump impeller 20$p$ and a turbine impeller 20$t$ that are connected to the engine 12 and the input shaft 22, respectively. The drive-force transmitting apparatus 16 is provided with a mechanical oil pump 44 connected to the pump impeller 20$p$. The oil pump 44 is to be driven by the engine 12, to supply a working fluid pressure as its original pressure to a hydraulic control unit (hydraulic control circuit) 46 provided in the vehicle 10, for performing a shifting control operation in the continuously-variable transmission mechanism 24, generating a belt clamping force in the continuously-variable transmission mechanism 24, and switching an operation state of each of the above-described engagement devices between its engaged state and released state.

The forward/reverse switching device 26 includes a planetary gear device 26$p$ of double-pinion type in addition to the first clutch C1 and the first brake B1. The planetary gear device 26$p$ is a differential mechanism including three rotary elements consisting of an input element in the form of a carrier 26$c$, an output element in the form of a sun gear 26$s$ and a reaction element in the form of a ring gear 26$r$. The carrier 26$c$ is connected to the input shaft 22. The ring gear 26$r$ is operatively connected to the casing 18 through the first brake B1. The sun gear 26$s$ is connected to a small-diameter gear 48 that is provided to be coaxial with the input shaft 22 and rotatable relative to the input shaft 22. The carrier 26c and the sun gear 26s are operatively connected to each other through the first clutch C1.

The gear mechanism 28 includes, in addition to the above-described small-diameter gear 48, a gear-mechanism counter shaft 50 and a large-diameter gear 52 which meshes with the small-diameter gear 48 and which is provided to be coaxial with the gear-mechanism counter shaft 50 and unrotatable relative to the gear-mechanism counter shaft 50. The large-diameter gear 52 has a diameter larger than that of the small-diameter gear 48. The gear mechanism 28 further includes an idler gear 54 that is provided to be coaxial with the gear-mechanism counter shaft 50 and rotatable relative to the gear-mechanism counter shaft 50, and an output gear 56 that is provided to be coaxial with the output shaft 30 and unrotatable relative to the output shaft 30. The output gear 56 has a diameter larger than that of the idler gear 54. Therefore, the gear mechanism 28 provides a gear ratio between the input shaft 22 and the output shaft 30 in the first drive-force transmitting path PT1. That is, the gear mechanism 28 corresponds to a gear mechanism configured to provide at least one gear ratio. The gear mechanism 28 further includes a dog clutch D1 as an engagement device that is disposed on the gear-mechanism counter shaft 50 between the large-diameter gear 52 and the idler gear 54 so as to selectively connect and disconnect a drive-force transmitting path between the two gears 52, 54. The dog clutch D1 is configured to selectively connect and disconnect the first drive-force transmitting path PT1, such that the first drive-force transmitting path PT1 is established with engagement of the dog clutch D1. The dog clutch D1, which is also included in the above-described plurality of engagement devices, serves as an engagement device that cooperates with the first clutch C1 or the first brake B1 to establish the first drive-force transmitting path PT1. That is, the first drive-force transmitting path PT1 is established with both of the dog clutch D1 and the first clutch C1 or both of the dog clutch D1 and the first brake B1 being engaged. An operation state of the dog clutch D1 is switched by operation of a hydraulic actuator (not shown) that is included in the drive-force transmitting apparatus 16.

The first drive-force transmitting path PT1 is established with both of the dog clutch D1 and the first engagement device being engaged, namely, with both of engagement of the dog clutch D1 and engagement of either one of the first clutch C1 and the first brake B1 which cooperate with each other to constitute the first engagement device and which are located to be closer to the input shaft 22 than the dog clutch D1. When the first clutch C1 as well as the dog clutch D1 is engaged, the first drive-force transmitting path PT1 for forward running of the vehicle 10 is established. When the first brake B1 as well as the dog clutch D1 is engaged, the first drive-force transmitting path PT1 for reverse running of the vehicle 10 is established. In the drive-force transmitting apparatus 16, with the first drive-force transmitting path PT1 being established, the drive-force transmitting apparatus 16 is placed in its drive-force transmittable state in which the drive force of the engine 12 is transmittable from the input shaft 22 to the output shaft 30 through the gear mechanism 28. With the first drive-force transmitting path PT1 being cut off by release of both of the first clutch C1 and the first brake B1 or by release of the dog clutch D1, the drive-force transmitting path PT1 is placed in its neutral state in which the drive force is not transmittable through the drive-force transmitting path PT1.

Figure 2:
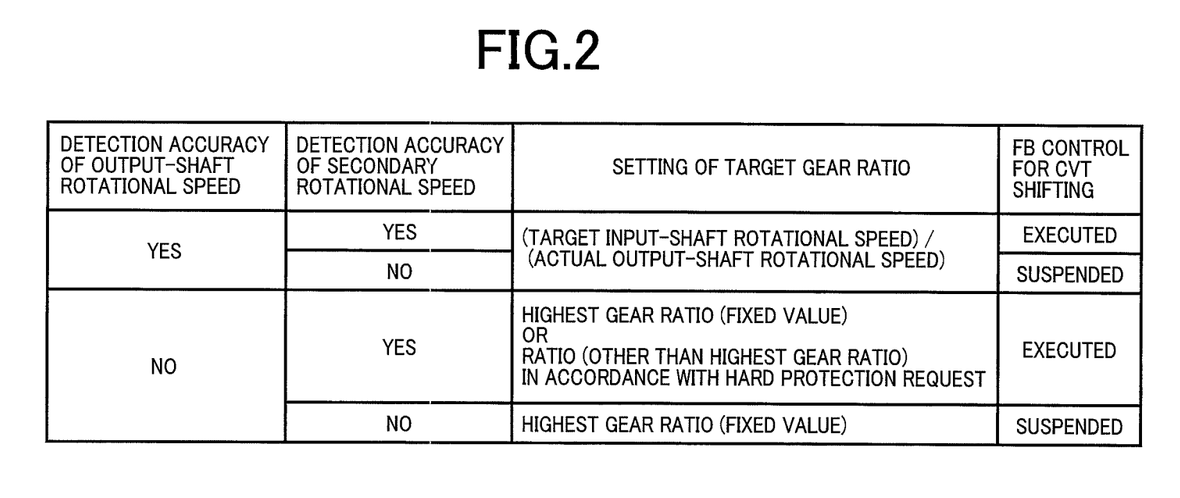
FIG. 2 is a table for explaining a relationship between a detection accuracy of an output-shaft rotational speed and a target gear ratio of a continuously-variable transmission mechanism.

FIG. 2 is a view for explaining a construction of the continuously-variable transmission mechanism 24. As shown in FIGS. 1 and 2, the continuously-variable transmission mechanism 24 includes a primary shaft 58 provided to be coaxial with the input shaft 22 and connected integrally to the input shaft 22, a primary pulley 60 connected to the primary shaft 58 and having a variable effective diameter, a secondary shaft 62 provided to be coaxial with the output shaft 30, a secondary pulley 64 connected to the secondary shaft 62 and having a variable effective diameter, and a transfer element in the form of a transmission belt 66 looped over or mounted on the pulleys 60, 64. The continuously-variable transmission mechanism 24 is a known belt-type continuously-variable transmission in which the drive force is transmitted owing to a friction force generated between the transmission belt 66 and each of the pulleys 60, 64, and is configured to transmit the drive force of the engine 12 toward the drive wheels 14. The friction force is synonymous with a clamping force, and is referred also to as a belt clamping force. The belt clamping force corresponds to a belt torque capacity Tcvt that is a torque capacity of the transmission belt 66 in the continuously-variable transmission mechanism 24.

The primary pulley 60 includes a fixed sheave 60a connected to the primary shaft 58, a movable sheave 60b unrotatable about an axis of the primary shaft 58 and axially movable relative to the fixed sheave 60a, and a hydraulic actuator 60c configured to apply a primary thrust Wpri to the movable sheave 60b. The primary thrust Wpri is a thrust (=primary pressure Ppri*pressure receiving area) for changing a width of a V-shaped groove defined between the fixed and movable sheaves 60a, 60b of the primary pulley 60. That is, the primary thrust Wpri is a thrust applied to the primary pulley 60 from the hydraulic actuator 60c, to clamp the transmission belt 66 that is mounted on the primary pulley 60. The primary pressure Ppri is a hydraulic pressure supplied from the hydraulic control unit 46 to the hydraulic actuator 60c, and serves as a pulley hydraulic pressure for generating the primary thrust Wpri. Meanwhile, the secondary pulley 64 includes a fixed sheave 64a connected to the secondary shaft 62, a movable sheave 64b unrotatable about an axis of the secondary shaft 62 and axially movable relative to the fixed sheave 64a, and a secondary hydraulic actuator 64c configured to apply a secondary thrust Wsec to the movable sheave 64b. The secondary thrust Wsec is a thrust (=secondary pressure Psec*pressure receiving area) for changing a width of a V-shaped groove defined between the fixed and movable sheaves 64a, 64b of the secondary pulley 64. That is, the secondary thrust Wsec is a thrust applied to the secondary pulley 64 from the secondary hydraulic actuator 64c, to clamp the transmission belt 66 that is mounted on the secondary pulley 64. The secondary pressure Psec is a hydraulic pressure supplied from the hydraulic control unit 46 to the secondary hydraulic actuator 64c, and serves as a pulley hydraulic pressure for generating the secondary thrust Wsec.

In the continuously-variable transmission mechanism 24, the primary and secondary pressures Ppri, Psec are controlled by the hydraulic control unit 46 that is controlled by the electronic control apparatus 90, whereby the primary and secondary thrusts Wpri, Wsec are respectively controlled. With the primary and secondary thrusts Wpri, Wsec being controlled, the widths of the V-shaped grooves of the respective pulleys 60, 64 are controlled to be changeable whereby a belt winding dimeter (effective diameter) of each of the pulleys 60, 64 is changeable and accordingly a gear ratio γcvt☐ (=primary rotational speed Npri/secondary rotational speed Nsec) of the continuously-variable transmission mechanism 24 is changeable. Further, with the primary and secondary thrusts Wpri, Wsec being controlled, the belt clamping force is controlled such that slipping of the transmission belt 66 is not caused. That is, with the primary and secondary thrusts Wpri, Wsec being controlled, the gear ratio γcvt of the continuously-variable transmission mechanism 24 is controlled to a target gear ratio γcvtt while the transmission belt 66 is prevented from being slipped. It is noted that the primary rotational speed Npri represents a rotational speed of the primary shaft 58 and that the secondary rotational speed Nsec represents a rotational speed of the secondary shaft 62.

In the continuously-variable transmission mechanism 24, when the primary pressure Ppri is increased, the width of the V-shaped groove of the primary pulley 60 is reduced whereby the gear ratio γcvt is reduced. The reduction of the gear ratio γcvt corresponds to a shift-up action performed in the continuously-variable transmission mechanism 24. In the continuously-variable transmission mechanism 24, the lowest gear ratio γmin is provided with the width of the V-shaped groove of the primary pulley 60 being minimized. Within a range of the gear ratio γcvt that can be provided by the continuously-variable transmission mechanism 24, the lowest gear ratio gear ratio γmin is a value of the gear ratio γcvt which makes it possible to maximize the running speed of the vehicle 10. Further, in the continuously-variable transmission mechanism 24, when the primary pressure Ppri is reduced, the width of the V-shaped groove of the primary pulley 60 is increased whereby the gear ratio γcvt is increased. The increase of the gear ratio γcvt corresponds to a shift-down action performed in the continuously-variable transmission mechanism 24. In the continuously-variable transmission mechanism 24, the highest gear ratio γmax is provided with the width of the V-shaped groove of the primary pulley 60 being maximized. Within the range of the gear ratio γcvt that can be provided by the continuously-variable transmission mechanism 24, the highest gear ratio gear ratio γmax is a value of the gear ratio γcvt which makes it possible to minimize the running speed of the vehicle 10. In the continuously-variable transmission mechanism 24, the belt slippage is prevented by the primary thrust Wpri and the secondary thrust Wsec, and the target gear ratio γcvtt is established by a combination of the primary thrust Wpri and the secondary thrust Wsec, rather than by only one of the primary thrust Wpri and the secondary thrust Wsec. The gear ratio γcvt of the continuously-variable transmission mechanism 24 is changed with change of a thrust ratio τ (=Wsec/Wpri) which is a ratio of the secondary thrust Wsec to the primary thrust Wpri and which is dependent on a relationship between the primary pressure Ppri and the secondary pressure Psec. For example, the gear ratio γcvt is increased with increase of the thrust ratio τ, namely, a shift-down action of the continuously-variable transmission mechanism 24 is caused with increase of the thrust ratio τ.

The output shaft 30 is provided to be coaxial with the secondary shaft 62 and rotatable relative to the secondary shaft 62. The second clutch C2 is provided in a drive-force transmitting path (that corresponds to a part of the above-described second drive-force transmitting path PT2) between the secondary pulley 64 and the output shaft 30. That is, the second clutch C2 is disposed between the continuously-variable transmission mechanism 24 and the drive wheels 14 in the second drive-force transmitting path PT2. The second drive-force transmitting path PT2 is established with engagement of the second clutch C2. In the drive-force transmitting apparatus 16, with the second drive-force transmitting path PT2 being established, the drive-force transmitting apparatus 16 is placed in its drive-force transmittable state in which the drive force of the engine 12 is transmittable from the input shaft 22 to the output shaft 30 through the continuously-variable transmission mechanism 24. With the second drive-force transmitting path PT2 being cut off by release of the second clutch C2, the drive-force transmitting apparatus 16 is placed in its neutral state in which the drive force is not transmittable. The gear ratio γcvt of the continuously-variable transmission mechanism 24 corresponds to a gear ratio established in the second drive-force transmitting path PT2.

In the drive-force transmitting apparatus 16, a gear ratio EL of the gear mechanism 28, which is a gear ratio γgear (=input-shaft rotational speed Nin/output-shaft rotational speed Nout) provided in the first drive-force transmitting path PT1, is higher than the above-described highest gear ratio γmax of the continuously-variable transmission mechanism 24 which is the highest gear ratio provided in the second drive-force transmitting path PT2. That is, the gear ratio EL is a value that makes it possible to reduce the running speed of the vehicle 10 more than the highest gear ratio γmax. The gear ratio EL of the gear mechanism 28 corresponds to a first-speed gear ratio γ1 in the drive-force transmitting apparatus 16. The highest gear ratio γmax of the continuously-variable transmission mechanism 24 corresponds to a second-speed gear ratio γ2 in the drive-force transmitting apparatus 16. Thus, any gear ratio provided in the second drive-force transmitting path PT2 is lower than the gear ratio provided in the first drive-force transmitting path PT1. It is noted that the input-shaft rotational speed Nin represents a rotational speed of the input shaft 22 and that the output-shaft rotational speed Nout represents a rotational speed of the output shaft 30.

The vehicle 10 can run in a selected one of the gear running mode and the belt running mode. The gear running mode is a running mode in which the vehicle 10 runs with the drive force being transmitted through the first drive-force transmitting path PT1 that is established in the drive-force transmitting apparatus 16. The belt running mode is a running mode in which the vehicle 10 runs with the drive force being transmitted through the second drive-force transmitting path PT2 that is established in the drive-force transmitting apparatus 16. When forward running of the vehicle 10 is to be made in the gear running mode, the first clutch C1 and the dog clutch D1 are engaged while the second clutch C2 and the first brake B1 are released. When reverse running of the vehicle 10 is to be made in the gear running mode, the first brake B1 and the dog clutch D1 are engaged while the second clutch C2 and the first clutch C1 are released. In the belt running mode, forward running of the vehicle 10 can be made.

The gear running mode is selected to be established when the vehicle 10 runs at a running speed within a relative low speed range or when the vehicle 10 is stopped. The belt running mode is selected to be established when the vehicle 10 runs at a running speed within a relatively high speed range including a middle speed range as well as a high speed range. When the belt running mode is established in the middle speed range, the dog clutch D1 is engaged. When the belt running mode is established in the high speed range, the dog clutch D1 is released, for example, for the purpose of avoiding drag of the gear mechanism 28 and other elements during running of the vehicle 10 in the belt running mode and preventing gears of the gear mechanism 28 and components (such as pinion gears) of the planetary gear device 26p from being rotated at high speeds.

The vehicle 10 is provided with the electronic control apparatus 90 as a controller including the control apparatus constructed according to present invention. For example, the electronic control apparatus 90 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 90 is configured to perform, for example, an engine control operation for controlling an output of the engine 12, a shifting control operation and a belt-clamping-force control operation for the continuously-variable transmission mechanism 24, and a hydraulic-pressure control operation for switching the operation state of each of the plurality of engagement devices (C1, B1, C2, D1). The electronic control apparatus 90 may be constituted by two or more control units exclusively assigned to perform different control operations such as the engine control operation and the hydraulic-pressure control operation.

The electronic control apparatus 90 receives various input signals based on values detected by respective sensors provided in the vehicle 10. Specifically, the electronic control apparatus 90 receives: an output signal of an engine speed sensor 70 indicative of an engine rotational speed Ne which is a rotational speed of the engine 12; an output signal of a primary speed sensor 72 indicative of a primary rotational speed Npri which is a rotational speed of the primary shaft 58 which is equivalent to an input-shaft rotational speed Nin; an output signal of a secondary speed sensor 74 indicative of a secondary rotational speed Nsec which is a rotational speed of the secondary shaft 62; an output signal of an output speed sensor 76 indicative of an output-shaft rotational speed Nout which is a rotational speed of the output shaft 30 and which corresponds to the running speed V of the vehicle 10; an output signal of an accelerator-operation amount sensor 78 indicative of an accelerator operation amount θacc which represents an amount of accelerating operation made by a vehicle operator; an output signal of a throttle-opening degree sensor 80 indicative of the throttle opening degree tap; and an output signal of a shift position sensor 82 indicative of an operation position POSsh of a manually-operated shifting member in the form of a shift lever 84 provided in the vehicle 10. Further, the electronic control apparatus 90 generates various output signals which are supplied to various devices such as the engine control device 42 and the hydraulic control unit 46 and which include an engine-control command signal Se for controlling the engine 12, a hydraulic control command signal Scvt for performing hydraulic controls such as controls of the shifting action and the belt clamping force of the continuously-variable transmission mechanism 24, and a hydraulic-control command signal Scbd for performing hydraulic controls such as controls of operation states of the plurality of engagement devices. It is noted that the input-shaft rotational speed Nin (=primary rotational speed Npri) is equivalent to a rotational speed of the turbine impeller 20t of the of the torque converter 20. It is also noted that the primary rotational speed Npri is equivalent to a rotational speed of the primary pulley 60 and that the secondary rotational speed Nsec is equivalent to a rotational speed of the secondary pulley 64. Further, the electronic control apparatus 90 calculates an actual gear ratio γcvt (=Npri/Nsec) that is an actual value of the gear ratio γcvt of the continuously-variable transmission mechanism 24, based on the primary rotational speed Npri and the secondary rotational speed Nsec.

The shift lever 84 is operable to be placed in a selected one of a plurality of operation positions POSsh that consist of, for example, a parking position P, a reverse position R, a neutral position N and a drive position D. With the shift lever 84 being placed in the parking position P, the drive-force transmitting apparatus 16 is placed in its parking position in which the drive-force transmitting apparatus 16 is placed in its neutral state and rotation of the output shaft 30 is mechanically inhibited (locked). The drive-force transmitting apparatus 16 is placed in the neutral state, for example, by releasing all of the first clutch C1, first brake B1 and second clutch C2. That is, the neutral state is a state of the drive-force transmitting apparatus 16 in which neither the first drive-force transmitting path PT1 nor the second drive-force transmitting path PT2 is established. With the shift lever 84 being placed in the reverse position R, the drive-force transmitting apparatus 16 is placed in its reverse drive position for enabling the reverse running of the vehicle 10 in the gear running mode. With the shift lever 84 being placed in the neutral position N, the drive-force transmitting apparatus 16 is placed in its neutral position in which the drive-force transmitting apparatus 16 is placed in its neutral state. With the shift lever 84 being placed in the drive position D, the drive-force transmitting apparatus 16 is placed in its forward drive position for enabling the forward running of the vehicle 10 in the gear running mode, or enabling the forward running of the vehicle 10 in the belt running mode with execution of an automatic shifting control of the continuously-variable transmission mechanism 24.

For performing various control operations in the vehicle 10, the electronic control apparatus 90 includes an engine control means or portion in the form of an engine control portion 92 and a transmission shifting control means or portion in the form of a transmission shifting control portion 94.

The engine control portion 92 calculates a required drive force Fdem, for example, by applying the accelerator operation amount θacc and the running velocity V to a predetermined or stored relationship (e.g., drive force map) that is obtained by experimentation or determined by an appropriate design theory. The engine control portion 92 sets a target engine torque Tet that ensures the required drive force Fdem, and outputs the engine-control command signal Se for controlling the engine 12 so as to obtain the target engine torque Tet. The outputted engine-control command signal Se is supplied to the engine control device 42.

When the operation position POSsh of the shift lever 84 is the parking position P or the neutral position N during stop of the vehicle 10, the transmission shifting control portion 94 supplies, to the hydraulic control unit 46, the hydraulic-control command signal Scbd requesting engagement of the dog clutch D1, in preparation of transition to the gear running mode. When the operation position POSsh is switched from the parking position P or the neutral position N to the drive position D during stop of the vehicle 10, the transmission shifting control portion 94 supplies, to the hydraulic control unit 46, the hydraulic-control command signal Scbd requesting engagement of the first clutch C1, whereby the gear running mode is established to enable forward running of the vehicle 10. When the operation position POSsh is switched from the parking position P or the neutral position N to the reverse position R during stop of the vehicle 10, the transmission shifting control portion 94 supplies, to the hydraulic control unit 46, the hydraulic-control command signal Scbd requesting engagement of the first brake B1, whereby the gear running mode is established to enable reverse running of the vehicle 10.

When the operation position POSsh is the drive position D, the transmission shifting control portion 94 executes a switching control operation for switching the running mode between the gear running mode and the belt running mode. Specifically, the transmission shifting control portion 94 determines whether shifting from one of first and second speed positions to the other is to be executed or not, by applying the running speed V and the accelerator operation amount θacc to a stepped shifting map in which shift-up lines, shift-down lines and hysteresis between each of the shift-up lines and a corresponding one of the shift-down lines are defined. The first speed position corresponds to the above-described gear ratio EL provided in the gear mechanism 28 by which the drive force is to be transmitted through the first drive-force transmitting path PT1 during the gear running mode. The second speed position corresponds to the above-described highest gear ratio γmax that is the highest one of the gear ratios (or that is a maximum value within a given range of a continuously-variable gear ratio) provided in the continuously-variable transmission mechanism 24 by which the drive force is to be transmitted through the second drive-force transmitting path PT2 during the belt running mode. Then, when determining that the shifting is to be executed, the transmission shifting control portion 94 switches the running mode from one of the gear running mode and the belt running mode to the other, so as to execute shifting up or down from one of the first and second speed positions to the other.

When determining that the running mode is to be switched from the gear running mode to the belt running mode so as to execute the shifting up from the first speed position to the second speed position during running in the gear running mode, the transmission shifting control portion 94 supplies, to the hydraulic control unit 46, the hydraulic-control command signal Scbd requesting releasing and engaging actions of the respective first and second clutches C1, C2, so as to perform a so-called "clutch to clutch" shifting operation. As a result of the shifting up from the first speed position to the second speed position, the second drive-force transmitting path PT2 is established in place of the first drive-force transmitting path PT1 in the drive-force transmitting apparatus 16. Thus, the transmission shifting control portion 94 executes a stepped shifting control to release and engage the first and second clutches C1, C2, respectively, so as to cause the drive-force transmitting apparatus 16 to execute the shift-up action by which the selected running mode (i.e., selected state) is switched from the gear running mode (i.e., first state) in which the first drive-force transmitting path PT1 is established to the belt running mode (i.e., second state) in which the second drive-force transmitting path PT2 is established. In the following description relating to the present embodiment, the shift-up action, which is executed by the drive-force transmitting apparatus 16 to switch the selected running mode from the gear running mode to the belt running mode, will be referred to as "stepped shift-up action".

When determining that the running mode is to be switched from the belt running mode to the gear running mode so as to execute the shifting down from the second speed position to the first speed position during running in the belt running mode, the transmission shifting control portion 94 supplies, to the hydraulic control unit 46, the hydraulic-control command signal Scbd requesting releasing and engaging actions of the respective second and first clutches C2, C1, so as to perform the clutch to clutch shifting operation. As a result of the shifting down from the second speed position to the first speed position, the first drive-force transmitting path PT1 is established in place of the second drive-force transmitting path PT2 in the drive-force trans-mitting apparatus 16. Thus, the transmission shifting control portion 94 executes a stepped shifting control to engage and release the first and second clutches C1, C2, respectively, so as to cause the drive-force transmitting apparatus 16 to execute the shift-down action by which the selected running mode is switched from the belt running mode in which the second drive-force transmitting path PT2 is established to the gear running mode in which the first drive-force transmitting path PT1 is established. In the following description relating to the present embodiment, the shift-down action, which is executed by the drive-force transmitting apparatus 16 to switch the selected running mode from the belt running mode to the gear running mode, will be referred to as "stepped shift-down action".

In the switching control operation for switching the running mode between the gear running mode and the belt running mode, the switching between the first and second drive-force transmitting paths PT1, PT2 is made by only the above-described clutch to clutch shifting operation for making a torque transfer via an transition state in which the dog clutch D1 is engaged in the belt running mode in the middle speed range, so that the switching control operation is performed with a shifting shock being restrained. The switching control operation executed for switching the running mode between the gear running mode and the belt running mode corresponds to the stepped-shifting control operation executed by switching the operation state of the first clutch C1 and the operation state of the second clutch C2.

For executing a shifting action in the continuously-variable transmission mechanism 24 during the belt running mode, the transmission shifting control portion 94 supplies, to the hydraulic control unit 46, the hydraulic-control command signal Scvt for controlling the primary pressure Ppri and the secondary pressure Psec such that the target gear ratio γcvtt is established in the continuously-variable transmission mechanism 24 while the belt slippage is not caused in the continuously-variable transmission mechanism 24.

Specifically, the transmission shifting control portion 94 calculates a target input-shaft rotational speed Nint that is a target value of the primary rotational speed Npri(=input-shaft rotational speed Nin), for example, by applying the accelerator operation amount θacc and the running speed V to a predetermined relationship such as a CVT shifting map. The transmission shifting control portion 94 calculates the target gear ratio γcvtt (=Nint/Nout) based on the target input-shaft rotational speed Nint and an actual output-shaft rotational speed Nout that is an actual value of the output-shaft rotational speed Nout. The transmission shifting control portion 94 calculates an estimated value of the engine torque Te, by applying the throttle opening degree tap and the engine rotational speed Ne to a predetermined relationship such as an engine torque map. The transmission shifting control portion 94 calculates a turbine torque Tt, based on the estimated value of the engine torque Te and a predetermined relationship such as characteristic of the torque converter 20. The transmission shifting control portion 94 uses the turbine torque Tt as a primary input torque Tpri that is an input torque inputted to the primary pulley 60. The primary input torque Tpri is a torque that is to act on the primary shaft 58. The transmission shifting control portion 94 calculates a thrust ratio τ for establishing a target gear ratio γcvtt, by applying the target gear ratio γcvtt and a torque ratio to a predetermined relationship such as a thrust ratio map, wherein the torque ratio is a ratio (=Tpri/Tprilim) of the calculated primary input torque Tpri to a predetermined limit torque Tprilim that can be inputted to the primary pulley 60. The transmission shifting control portion 94 calculates a target primary thrust Wprit and a target secondary thrust Wsect that cooperate with each other to establish the thrust ratio τ. In this instance, if one of the target primary thrust Wprit and the target secondary thrust Wsect is determined, the other can be determined based on the thrust ratio τ that establishes the target gear ratio γcvtt. The transmission shifting control portion 94 converts the target primary thrust Wprit and the target secondary thrust Wsect into a target primary pressure Pprit (=Wprit/pressure receiving area) and a target secondary pressure Psect (=Wsect/pressure receiving area), respectively. The transmission shifting control portion 94 supplies, to the hydraulic control unit 46, the hydraulic-control command signal Scvt by which the primary pressure Ppri and the secondary pressure Psec is controlled to the target primary pressure Pprit and the target secondary pressure Psect, respectively. The hydraulic control unit 46 regulates the primary pressure Ppri and the secondary pressure Psec, by operating solenoid valves in accordance with the hydraulic-control command signal Scvt. In the above description relating to the shifting control of the continuously-variable transmission mechanism 24, the thrusts, which are required for enabling the gear ratio γcvt to be held at the target gear ratio γcvtt, have been discussed for the convenience of description. In process of a shifting action executed in the continuously-variable transmission mechanism 24, actually, thrusts required for executing a desired shift-up action or shift-down action are added to the thrusts required for enabling the gear ratio γcvt to be held at the target gear ratio γcvtt.

In calculation of each of the target primary thrust Wprit and the target secondary thrust Wsect, a required thrust, which is minimally required to prevent the belt slippage in the continuously-variable transmission mechanism 24, is taken into consideration. This required thrust is a belt-slip limit thrust that is a thrust value shortly before occurrence of the belt slippage in the continuously-variable transmission mechanism 24.

The transmission shifting control portion 94 sets a primary limit thrust Wprilim that is the limit thrust for the primary pulley 60 and a secondary limit thrust Wseclim that is the limit thrust for the secondary pulley 64. The transmission shifting control portion 94 sets the primary limit thrust Wprilim by using equation (1) given below, and sets the secondary limit thrust Wseclim by using equation (2) given below. In the equations (1) and (2), "a" represents a sheave angle of the pulleys 60, 64, "μ" represents a coefficient of friction generating between the sheave and the element of the belt, "Rpri" represents ½ of the belt winding diameter (effective diameter) of the primary pulley 60, which is calculated based on the gear ratio γcvt of the continuously-variable transmission mechanism 24, "γcvt*Tpri" represents a torque inputted to the secondary pulley 64, and "Rsec" represents ½ of the belt winding diameter (effective diameter) of the secondary pulley 64, which is calculated based on the gear ratio γcvt of the continuously-variable transmission mechanism 24. It is noted that the sheave angle α is an angle defined between a conical surface of each of the pulleys 60, 64 and a plane perpendicular to an axis of the each of the pulleys 60, 64.

$$Wprilim=(Tpr*\cos \alpha)/(2*\mu*Rpri) \quad (1)$$

$$Wseclim=(\gamma cvt*Tpri*\cos \alpha)/(2*\mu*Rsec) \quad (2)$$

The transmission shifting control portion 94 calculates a secondary shifting-control thrust Wsecsh (=τ*Wprilim) as a thrust that is required to be applied to the secondary pulley 64 for the shift control, based on the primary limit thrust Wprilim and the thrust ratio τ that is required to establish the target gear ratio γcvtt. The transmission shifting control portion 94 sets, as a target secondary thrust Wsect, a larger one of the secondary limit thrust Wseclim and the secondary shifting-control thrust Wsecsh. The transmission shifting control portion 94 calculates the target primary thrust Wprit (=Wsect/T), based on the target secondary thrust Wsect and the thrust ratio τ that is required to establish the target gear ratio γcvtt. The transmission shifting control portion 94 calculates a feedback control amount that makes the actual gear ratio γcvt coincident with the target gear ratio γcvtt, and then compensate the target primary thrust Wprit (that is calculated based on the target secondary thrust Wsect and the thrust ratio τ), by adding the calculated feedback control amount to the target primary thrust Wprit.

It is preferable to establish the target gear ratio γcvtt of the continuously-variable transmission mechanism 24 while preventing a belt slippage in the continuously-variable transmission mechanism 24, not only in a belt-running-mode situation in which the vehicle 10 is running in the belt running mode but also in other situations such as a situation in which the vehicle 10 is running in the gear running mode, a situation in which the switching control operation is executed to switch the running mode between the gear running mode and the belt running mode, and a situation in which a garage operation is executed by operation of the shift lever 84 between the neutral position N and the drive position D. Thus, even in the other situations (other than the belt-running-mode situation), like in the belt-running-mode situation, the transmission shifting control portion 94 sets the target primary thrust Wprit and the target secondary thrust Wsect, and supplies, to the hydraulic control unit 46, the hydraulic control command signal Scvt for controlling the primary pressure Ppri and the secondary pressure Psec. However, the primary input torque Tpri becomes a torque value dependent on the operation state of the second clutch C2. When the second clutch C2 is fully released, for example, during the running in the gear running mode, the primary input torque Tpri is made zero. Further, when the second clutch C2 is in a transition state between the release and engagement, for example, during execution of the switching control operation, the primary input torque Tpri becomes a torque value corresponding to the torque capacity of the second clutch C2 converted onto the primary shaft 58. The torque capacity of the second clutch C2 is calculated, for example, based on the hydraulic control command signal Scbd.

Where a known electromagnetic-pickup-type sensor is used as each of the rotational speed sensors 70, 72, 74, 76, for example, there is a possibility that a sufficient accuracy of detected value of the rotational speed detected by each of the speed sensors 70, 72, 74, 76 is not assured due to characteristics of each of the speed sensors 70, 72, 74, 76, when an actual rotational speed is in a low rotational-speed region that is very close to zero. When the accuracy of detection of the output-shaft rotational speed Nout is not assured, it is not possible to correctly calculate the target gear ratio γcvtt(=Nin/Nout) of the continuously-variable transmission mechanism 24. There will be described setting of the target gear ratio γcvtt, which is made depending on whether or not there is the detection accuracy of the output-shaft rotational speed Nout. In the following descriptions relating to the setting of the target gear ratio γcvtt, there will be described, as an example of a case in which the detection accuracy of the output-shaft rotational speed Nout is not assured, a case in which the vehicle 10 is being stopped.

FIG. 2 is a table for explaining a relationship between the detection accuracy of the output-shaft rotational speed Nout and the target gear ratio γcvtt of the continuously-variable transmission mechanism 24. "FB CONTROL FOR CVT SHIFTING" in FIG. 2 is a feedback control that is executed to make the actual gear ratio γcvt coincident with the target gear ratio γcvtt in the above-described shifting control of the continuously-variable transmission mechanism 24.

As shown in FIG. 2, when the vehicle 10 is not being stopped and is running at a certain degree of running speed V providing the detection accuracy of the output-shaft rotational speed Nout, the target gear ratio γcvtt of the continuously-variable transmission mechanism 24 is calculated based on the actual output-shaft rotational speed Nout and the target input-shaft rotational speed Nint. Even when there is the detection accuracy of the output-shaft rotational speed Nout is assured, the actual gear ratio γcvt (=Npri/Nsec) cannot be correctly calculated, for example, in the event of stall of the engine 12 during the running, which causes the primary and secondary pulleys 60, 64 to be sopped. Thus, the feedback control (for the CVT shifting) is executed when there is the detection accuracy of the secondary rotational speed Nsec. However, when there is not the detection accuracy of the secondary rotational speed Nsec, the CVT control is suspended. It is noted that, in the event of stall of the engine 12, the oil pump 44 is not driven whereby all of the engagement devices are released so that the drive-force transmitting apparatus 16 is placed in the neutral state.

When there is not the detection accuracy of the output-shaft rotational speed Nout because of stop of the vehicle 10, the target gear ratio γcvtt of the continuously-variable transmission mechanism 24 is basically set to the highest gear ratio γmax as a predetermined fixed value. When the vehicle 10 is being stopped with either one of the first and second drive-force transmitting paths PT1, PT2 being established, the rotations of the primary and secondary pulleys 60, 64 are both stopped, so that the actual gear ratio γcvt cannot be correctly calculated. Thus, when there is not the detection accuracy of the secondary rotational speed Nsec, the above-described feedback control is suspended. On the other hand, even when the vehicle 10 is being stopped, the primary and secondary pulleys 60, 64 are rotated depending on the engine rotational speed Ne, if the drive-force transmitting apparatus 16 is in the neutral state. Thus, the actual gear ratio γcvt can be correctly calculated and accordingly the shifting control of the continuously-variable transmission mechanism 24 can be executed. Therefore, when there is the detection accuracy of the secondary rotational speed Nsec, the above-described feedback control is executed.

There is known a drive-force transmitting apparatus in which the continuously-variable transmission mechanism 24 is provided in a drive-force transmitting path between the engine 12 and the drive wheels 14 such that the continuously-variable transmission mechanism 24 is disposed in series with the forward/reverse switching device 26 and is located between the forward/reverse switching device 26 and the drive wheels 14 in the drive-force transmitting path. In such a drive-force transmitting apparatus, during stop of the vehicle 10 even with the drive-force transmitting apparatus being placed in its neutral state, the rotations of the primary and secondary pulleys 60, 64 are both stopped, so that the actual gear ratio γcvt cannot be correctly calculated and accordingly the shifting control of the continuously-variable transmission mechanism 24 cannot be executed.

In the continuously-variable transmission mechanism 24, the width of the V-shaped groove of the primary pulley 60 is maximized with the movable sheave 60b being positioned in a position in which the movable sheave 60b is mechanically inhibited from being further moved in a direction that increases the width of the V-shaped groove of the primary pulley 60. Thus, when the gear ratio γcvt of the continuously-variable transmission mechanism 24 is the highest gear ratio γmax, the belt torque capacity Tcvt is assured to prevent a belt slippage even with reduction of the target primary pressure Pprit for establishing the highest gear ratio γmax. Therefore, when the target gear ratio γcvtt is set to the highest gear ratio γmax, the target primary thrust Wprit is set to, for example, a thrust value lower than the primary thrust Wpri for establishing the highest gear ratio γmax.

By the way, when the vehicle 10 is being stopped with the drive-force transmitting apparatus 16 being in the neutral state, the shifting action can be executed in the continuously-variable transmission mechanism 24. In this instance, in the event of a failure that causes the hydraulic control unit 46 to output the secondary pressure Psec that maximizes the secondary thrust Wsec, if the primary thrust Wpri is reduced, an excessively large load could be applied to a member or the like that mechanically inhibits movement of the movable sheave 60b in the direction that increases the width of the V-shaped groove of the primary pulley 60, whereby durability of the continuously-variable transmission mechanism 24 could be reduced. Therefore, in the event of such a failure, it is preferable to restrain or avoid the reduction of durability of the continuously-variable transmission mechanism 24, by increasing the primary thrust Wpri so as to restrain or remove the load applied to the member or the like that mechanically inhibits the movement of the movable sheave 60b. In the present embodiment, in the event of such a failure, the target gear ratio γcvtt is set to "1" (as an example of a lower gear ratio that is lower than the highest gear ratio γmax), for example, for causing the primary thrust Wpri to be increased. Further, when a balance of flow rate of the working fluid is lost (particularly, a flow rate of the working fluid is made insufficient) by execution of a shifting action of the continuously-variable transmission mechanism 24, the required belt torque capacity Tcvt is not assured whereby a belt slippage could occur so that durability of the continuously-variable transmission mechanism 24 could be reduced. Therefore, when the balance of flow rate of the working fluid could be lost, it is preferable to assure the required belt torque capacity Tcvt by temporarily suspending the shifting action of the continuously-variable transmission mechanism 24, so as to restrain or avoid reduction of durability of the continuously-variable transmission mechanism 24. To this end, when the balance of flow rate of the working fluid could be lost, the target gear ratio γcvtt is set to a current value of the actual gear ratio γcvt (as an example of a lower gear ratio that is lower than the highest gear ratio γmax), for temporarily suspending the shifting action of the continuously-variable transmission mechanism 24.

In the following descriptions relating to the present embodiment, the restraining or avoiding reduction of durability of the continuously-variable transmission mechanism 24 will be referred to as "hardware protection". Further, the setting the target gear ratio γcvtt of the continuously-variable transmission mechanism 24 to a predetermined lower gear ratio that is lower than the highest gear ratio γmax for the hardware protection will be referred to as "setting the target gear ratio γcvtt of the continuously-variable transmission mechanism 24 to a value other than the highest gear ratio γmax, which is in accordance with a hardware protection request (lower-gear-ratio setting request)".

As shown in FIG. 2, when there is not the detection accuracy of the output-shaft rotational speed Nout and there is the detection accuracy of the secondary rotational speed Nsec, if there is the hardware protection request that requests the target gear ratio γcvtt to be set to a value other than the highest gear ratio γmax, the target gear ratio γcvtt of the continuously-variable transmission mechanism 24 is set to a value in accordance with the hardware protection request, rather than being set to the highest gear ratio γmax.

The electronic control apparatus 90 further includes an accuracy determining means or portion in the form of an accuracy determining portion 96 and a request determining means or portion in the form of a request determining portion 98, for performing control operations to set the target gear ratio γcvtt to a value depending on whether there is the detection accuracy of the output-shaft rotational speed Nout or not.

The accuracy determining portion 96 makes a determination as to whether there is the detection accuracy of the output-shaft rotational speed Nout or not. The accuracy determining portion 96 makes this determination based on a determination as to whether a value of the output-shaft rotational speed Nout detected by the rotational speed sensor 76 is lower than an extremely low speed value Noutf. This extremely low speed value Noutf is a predetermined lower limit value, which is minimally required to enable the output-shaft rotational speed Nout to be accurately detected, for example, due to characteristic of the rotational speed sensor 76.

For example, the accuracy determining portion 96 makes the above determination based on a determination as to whether the vehicle 10 is being stopped or not. Thus, the determination as to whether the detection accuracy of the output-shaft rotational speed Nout is insufficient or not corresponds to the determination as to whether the vehicle 10 is being stopped or not. That is, the accuracy determining portion 96 determines whether the vehicle 10 is being stopped or not. When determining that the vehicle 10 is being stopped, the accuracy determining portion 96 determines that the detection accuracy of the output-shaft rotational speed Nout is insufficient, namely, there is not the detection accuracy of the output-shaft rotational speed Nout.

The accuracy determining portion 96 further makes a determination as to whether there is the detection accuracy of the secondary rotational speed Nsec or not. The accuracy determining portion 96 makes this determination based on a determination as to whether a value of the secondary rotational speed Nsec detected by the rotational speed sensor 74 is lower than an extremely low speed value Nsecf. This extremely low speed value Nsecf is a predetermined lower limit value, which is minimally required to enable the secondary rotational speed Nsec to be accurately detected, for example, due to characteristic of the rotational speed sensor 74.

For example, when determining that there is not the detection accuracy of the output-shaft rotational speed Nout, the accuracy determining portion 96 makes the above determination based on a determination as to whether the drive-force transmitting apparatus 16 is in the neutral state or not. Thus, when there is not the detection accuracy of the output-shaft rotational speed Nout, the determination as to whether the detection accuracy of the secondary rotational speed Nsec is sufficient or not corresponds to the determination as to whether the drive-force transmitting apparatus 16 is in the neutral state or not. That is, when determining that the vehicle 10 is in being stopped, the accuracy determining portion 96 determines whether the drive-force transmitting apparatus 16 is in the neutral state or not. When determining that the drive-force transmitting apparatus 16 is in the neutral state during stop of the vehicle 10, the accuracy determining portion 96 determines that the detection accuracy of the secondary rotational speed Nsec is sufficient, namely, there is the detection accuracy of the secondary rotational speed Nsec.

The request determining portion 98 determines whether or not there is a request that requests the target gear ratio γcvtt to set to a value other than the highest gear ratio γmax, which is in accordance with the hardware protection request. That is, the request determining portion 98 determines there is the hardware protection request that requires the target gear ratio γcvtt to be set to a value other than the highest gear ratio γmax. The request determining portion 98 determines that there is the request that requests the target gear ratio γcvtt to be set to a value other than the highest gear ratio γmax, which is in accordance with the hardware protection request, when (i) there is a failure that causes the hydraulic control unit 46 to output the secondary pressure Psec that maximizes the secondary thrust Wsec, and/or (ii) a balance of flow rate of the working fluid could be lost if a shifting action of the continuously-variable transmission mechanism 24 is executed.

When it is determined by the accuracy determining portion 96 that there is not the detection accuracy of the output-shaft rotational speed Nout, if it is determined by the request determining portion 98 that there is the request that requests the target gear ratio γcvtt to be set to a value other than the highest gear ratio γmax, which is in accordance with the hardware protection request, the transmission shifting control portion 94 sets the target gear ratio γcvtt to the value in accordance with the hardware protection request. For example, when there is the failure that causes the hydraulic control unit 46 to output the secondary pressure Psec that maximizes the secondary thrust Wsec, the transmission shifting control portion 94 sets the target gear ratio γcvtt to "1" as the value in accordance with the hardware protection request. Further, for example, when the balance of flow rate of the working fluid could be lost if a shifting action of the continuously-variable transmission mechanism 24 is executed, the transmission shifting control portion 94 sets the target gear ratio γcvtt to a current value of the actual gear ratio γcvt as the value in accordance with the hardware protection request. Moreover, when the above-described failure occurs and at the same time the lost of the flow rate balance could occur, the transmission shifting control portion 94 sets the target gear ratio γcvtt to a value that is dependent on which one of the above-described failure and the lost of the flow rate balance should be coped with a higher priority. For example, one of the failure and the lost of the flow rate balance, which could affect the durability of the continuously-variable transmission mechanism 24 more seriously, may be coped with a higher priority. In the present embodiment, when the above-described failure occurs and at the same time the lost of the flow rate balance could occur, the above-described failure is coped with a higher priority so that the target gear ratio γcvtt is set to "1" as the value in accordance with the hardware protection request.

On the other hand, when it is determined by the accuracy determining portion 96 that there is not the detection accuracy of the output-shaft rotational speed Nout, if it is determined by the request determining portion 98 that there is not the request that requests the target gear ratio γcvtt to be set to a value other than the highest gear ratio γmax, which is in accordance with the hardware protection request, the transmission shifting control portion 94 sets the target gear ratio γcvtt to the highest gear ratio γmax.

For example, when it is determined by the accuracy determining portion 96 that the vehicle 10 is being stopped and that the drive-force transmitting apparatus 16 is in the neutral state, if it is determined by the request determining portion 98 that there is the request that requests the target gear ratio γcvtt to be set to a value other than the highest gear ratio γmax, which is in accordance with the hardware protection request, the transmission shifting control portion 94 sets the target gear ratio γcvtt to the value in accordance with the hardware protection request. On the other hand, when it is determined by the accuracy determining portion 96 that the vehicle 10 is being stopped and that the drive-force transmitting apparatus 16 is in the neutral state, if it is determined by the request determining portion 98 that there is not the request that requests the target gear ratio γcvtt to be set to a value other than the highest gear ratio γmax, which is in accordance with the hardware protection request, the transmission shifting control portion 94 sets the target gear ratio γcvtt to the highest gear ratio γmax. Further, when it is determined by the accuracy determining portion 96 that the vehicle 10 is being stopped, if it is determined by the accuracy determining portion 96 that the drive-force transmitting apparatus 16 is not in the neutral state, namely, that one of the first and second drive-force transmitting paths PT1, PT2 is established, the transmission shifting control portion 94 sets the target gear ratio γcvtt to highest gear ratio γmax.

When it is determined by the accuracy determining portion 96 that there is the detection accuracy of the output-shaft rotational speed Nout, the transmission shifting control portion 94 calculates the target gear ratio γcvtt (=Nint/Nout) of the continuously-variable transmission mechanism 24, by using the actual output-shaft rotational speed Nout (i.e., a detected value of the actual output-shaft rotational speed Nout) and the target input-shaft rotational speed Nint.

Figure 3:
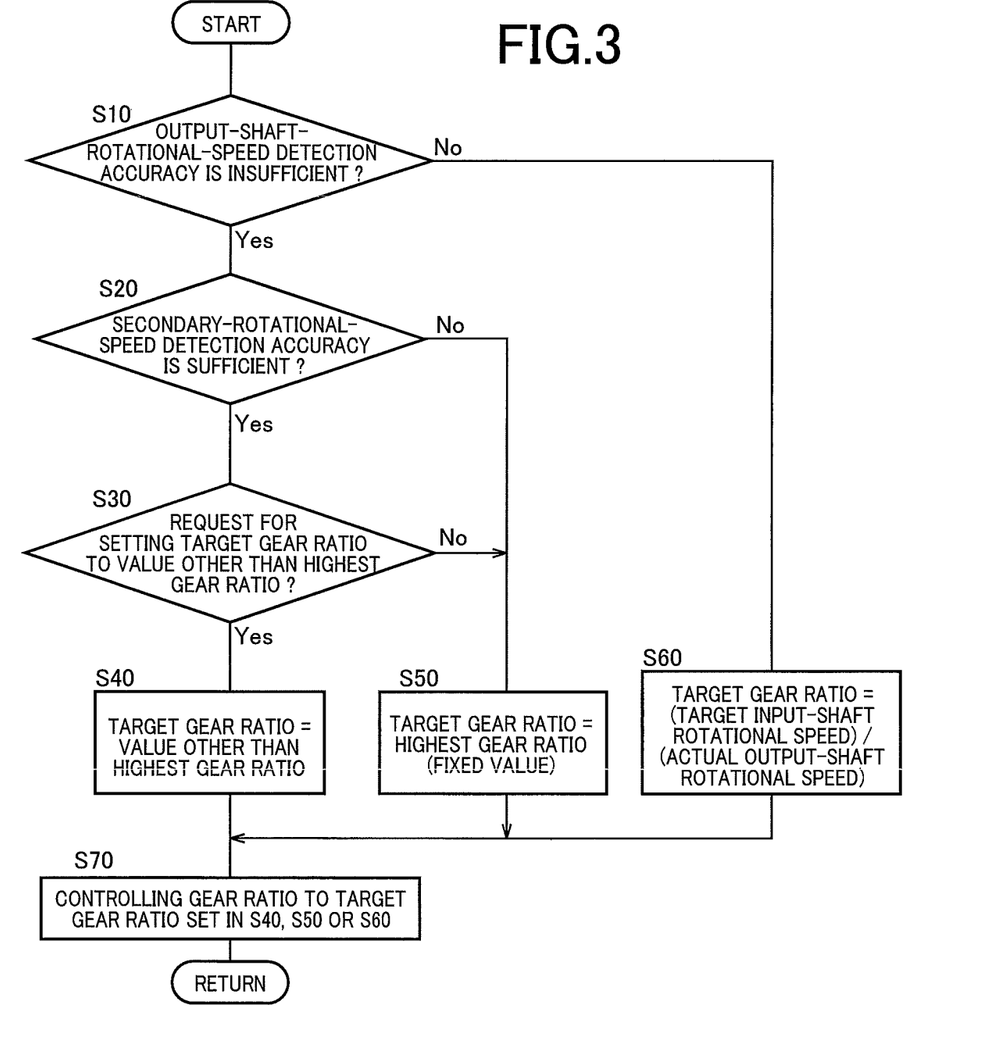
FIG. 3 is a flow chart showing a main part of a control routine executed by the electronic control apparatus, namely, a control routine that is executed for retraining or avoiding reduction of durability of the continuously-variable transmission mechanism when the detection accuracy of the output-shaft rotational speed is not assured.

FIG. 3 is a flow chart showing a main part of a control routine executed by the electronic control apparatus 90, namely, a control routine that is executed for retraining or avoiding reduction of durability of the continuously-variable transmission mechanism 24 when the detection accuracy of the output-shaft rotational speed Nout is not assured. This control routine is executed, for example, in a repeated manner.

As shown in FIG. 3, the control routine is initiated with step S10 corresponding to function of the accuracy determining portion 96, which is implemented to determine whether the detection accuracy of the output-shaft rotational speed Nout is insufficient or not, for example, based on a determination as to whether the vehicle 10 is being stopped or not. When an affirmative determination is made at step S10, step S20 corresponding to function of the accuracy determining portion 96 is implemented to determine whether the detection accuracy of the secondary rotational speed Nsec is sufficient or not, for example, based on a determination as to whether the drive-force transmitting apparatus 16 is in the neutral state or not. When an affirmative determination is made at step S20, step S30 corresponding to function of the request determining portion 98 is implemented to determine whether there is the request that requests the target gear ratio γcvtt to be set to a value other than the highest gear ratio γmax, which is in accordance with the hardware protection request. When an affirmative determination is made at step S30, step S40 corresponding to function of the transmission shifting control portion 94 is implemented to set the target gear ratio γcvtt to the value in accordance with the hardware protection request. On the other hand, when a negative determination is made at step S20 or step S30, the control flow goes to step S50 corresponding to function of the transmission shifting control portion 94, which is implemented to set the target gear ratio γcvtt of the continuously-variable transmission mechanism 24 to the highest gear ratio γmax. When a negative determination is made at step S10, the control flow goes to step S60 corresponding to function of the transmission shifting control portion 94, which is implemented to calculate the target gear ratio γcvtt (=Nint/Nout) based on the actual output-shaft rotational speed Nout and the target input-shaft rotational speed Nint. Step S40, S50 or S60 is followed by step S70 corresponding to function of the transmission shifting control portion 94, which is implemented to control the gear ratio γcvt of the continuously-variable transmission mechanism 24, to the target gear ratio γcvtt that has been set to the corresponding value in step S40, S50 or S60. That is, the target gear ratio γcvtt, which has been set to the corresponding value in step S40, S50 or S60, is reflected in implementation of step S70.

As described above, in the present embodiment, when it is determined that there is not the detection accuracy of the output-shaft rotational speed Nout, the target gear ratio γcvtt of the continuously-variable transmission mechanism 24 is set to the lower gear ratio that is lower than the highest gear ratio γmax, if there is the lower-gear-ratio setting request, i.e., the hardware protection request intended to restrain or avoid reduction of durability of the continuously-variable transmission mechanism 24. Thus, when the durability of the continuously-variable transmission mechanism 24 could be reduced by causing the gear ratio γcvt of the continuously-variable transmission mechanism 24 to become the highest gear ratio γmax, the gear ratio γcvt of the continuously-variable transmission mechanism 24 is not controlled to the highest gear ratio γmax. It is therefore possible to restrain or avoid reduction of the durability of the continuously-variable transmission mechanism 24 when the detection accuracy of the output-shaft rotational speed Nout is not assured. Further, when it is determined that there is not the detection accuracy of the output-shaft rotational speed Nout, the target gear ratio γcvtt of the continuously-variable transmission mechanism 24 is set to the highest gear ratio γmax, if there is not the lower-gear-ratio setting request, i.e., hardware protection request. Thus, when the target gear ratio γcvtt cannot be calculated by using the actual output-shaft rotational speed Nout, the gear ratio γcvt of the continuously-variable transmission mechanism 24 is controlled to the highest gear ratio γmax.

In the present embodiment, the determination as to whether there is the detection accuracy of the output-shaft rotational speed Nout is made by determining whether the vehicle 10 is being stopped or not, such that it is determined that there is not the detection accuracy of the output-shaft rotational speed Nout when the vehicle 10 is being stopped. It is therefore possible to restrain or avoid reduction of the durability of the continuously-variable transmission mechanism 24 when the vehicle 10 is being stopped.

In the present embodiment, when the vehicle 10 is being stopped in a neutral state of the drive-force transmitting apparatus 16, namely, in a state in which both of the first and second engagement devices are released, the target gear ratio γcvtt of the continuously-variable transmission mechanism 24 is set to the lower gear ratio that is lower than the highest gear ratio γmax, namely, set to the value in accordance with the lower-gear-ratio setting request, i.e., the hardware protection request, if there is the same request intended to restrain or avoid reduction of durability of the continuously-variable transmission mechanism 24. Thus, when the durability of the continuously-variable transmission mechanism 24 could be reduced by causing the gear ratio γcvt of the continuously-variable transmission mechanism 24 to become the highest gear ratio γmax, the gear ratio γcvt of the continuously-variable transmission mechanism 24 is not controlled to the highest gear ratio γmax. It is therefore possible to restrain or avoid reduction of the durability of the continuously-variable transmission mechanism 24 when the detection accuracy of the output-shaft rotational speed Nout is not assured. Further, when the vehicle 10 is being stopped with the drive-force transmitting apparatus 16 being in the neutral state, the target gear ratio γcvtt of the continuously-variable transmission mechanism 24 is set to the highest gear ratio γmax, if there is not the lower-gear-ratio setting request, i.e., the hardware protection request. Thus, when the target gear ratio γcvtt cannot be calculated by using the actual output-shaft rotational speed Nout, the gear ratio γcvt of the continuously-variable transmission mechanism 24 is controlled to the highest gear ratio γmax.

In the present embodiment, when the vehicle 10 is being stopped with one of the first and second drive-force transmitting paths PT1, PT2 being established, the target gear ratio γcvtt of the continuously-variable transmission mechanism 24 is set to the highest gear ratio γmax. That is, when the target gear ratio γcvtt cannot be calculated by using the actual output-shaft rotational speed Nout and a shifting action of the continuously-variable transmission mechanism 24 cannot be executed, the target gear ratio γcvtt is fixed to the highest gear ratio γmax.

In the present embodiment, when there is the detection accuracy of the output-shaft rotational speed Nout, the target gear ratio γcvtt of the continuously-variable transmission mechanism 24 is calculated based on the actual output-shaft rotational speed Nout and the target input-shaft rotational speed Nint, so that the target gear ratio γcvtt is set to a value suitable for a running state of the vehicle 10.

In the present embodiment, the lower-gear-ratio setting request, i.e., the hardware protection request, is intended to restrain or avoid reduction of durability of the continuously-variable transmission mechanism 24. Thus, when the detection accuracy of the output-shaft rotational speed Nout is not assured, it is possible to restrain or avoid reduction of durability of the continuously-variable transmission mechanism 24.

While the preferred embodiment of this invention has been described in detail by reference to the drawings, it is to be understood that the invention may be otherwise embodied.

For example, in the above-described embodiment, in the control routine shown in FIG. 3, the implementation of step S20 is not essential. That is, when there is not the detection accuracy of the output-shaft rotational speed Nout, if there is the request that requests the target gear ratio γcvtt to be set to a value other than the highest gear ratio γmax, which is in accordance with the hard protection request, the target gear ratio γcvtt of the continuously-variable transmission mechanism 24 may be set to the value in accordance with the hardware protection request, irrespective of whether there is the detection accuracy of the secondary rotational speed Nsec or not. That is, in the present embodiment, the target gear ratio γcvtt may be set to a value that is dependent on at least the detection accuracy of the output-shaft rotational speed Nout and the lower-gear-ratio setting request, i.e., the hardware protection request.

In the above descriptions relating to the setting of the target gear ratio γcvtt in the embodiment, there has been described the case in which the vehicle 10 is being stopped, as an example of the case in which the detection accuracy of the output-shaft rotational speed Nout is not assured. However, the case in which the detection accuracy of the output-shaft rotational speed Nout is not assured may be, for example, a case in which the vehicle 10 is running at an extremely low speed that is lower than the above-described extremely low speed value Noutf.

In the above-described embodiment, the target gear ratio γcvtt of the continuously-variable transmission mechanism 24 is calculated based on the actual output-shaft rotational speed Nout and the target input-shaft rotational speed Nint, when there is the detection accuracy of the output-shaft rotational speed Nout. However, not only when there is not the detection accuracy of the output-shaft rotational speed Nout but also when there is the detection accuracy of the output-shaft rotational speed Nout, the target gear ratio γcvtt of the continuously-variable transmission mechanism 24 may be set to a value in accordance with the hardware protection request, if there is the request that requests the target gear ratio γcvtt to be set to the value in accordance with the hardware protection request.

In the above-described embodiment, the gear mechanism 28 is a gear mechanism which provides a single gear ratio that is higher than the highest gear ratio γmax of the continuously-variable transmission mechanism 24. However, the gear mechanism 28 may be, for example, a gear mechanism which provides a plurality of different gear ratios. That is, the gear mechanism 28 may be a gear mechanism in which a shifting action is to be executed from one of two or more gear positions to the other. Further, the gear mechanism 28 may be a gear mechanism that provides a gear ratio that is lower than the lowest gear ratio γmin of the continuously-variable transmission mechanism 24 in addition to the gear ratio that is higher than the highest gear ratio γmax of the continuously-variable transmission mechanism 24.

In the above-described embodiment, the running mode of the drive-force transmitting apparatus 16 is switched between the gear running mode and the belt running mode, by using the shifting map in which the shift-up lines and shift-down lines are defined. However, the running mode of the drive-force transmitting apparatus 16 may be switched by setting a gear ratio satisfying the required drive force Fdem that is calculated based on the running speed V and the accelerator operation amount θacc.

In the above-described embodiment, the torque converter 20 is used as fluid-operated drive-force transmitting device. However, in place of the torque converter 20, any one of other types of fluid-operated drive-force transmitting devices such as a fluid coupling, which do not have a torque boosting function, may be used, for example. Further, the fluid-operated drive-force transmitting device does not have to be necessarily provided. In the above-described embodiment, the dog clutch D1 is provided in the first drive-force transmitting path PT1 through which the drive force is to be transmitted by the gear mechanism 28. However, the provision of the dog clutch D1 is not essential for carrying out the invention.

It is to be understood that the embodiment described above is given for illustrative purpose only, and that the present invention may be embodied with various modifications and improvements which may occur to those skilled in the art.

NOMENCLATURE OF ELEMENTS

12: engine (drive force source)
14: drive wheels
16: vehicle drive-force transmitting apparatus
22: input shaft (input rotary member)
24: continuously-variable transmission mechanism
28: gear mechanism
30: output shaft (output rotary member)
60: primary pulley
64: secondary pulley
66: transmission belt (transfer element)
90: electronic control apparatus (control apparatus)
94: transmission shifting control portion
96: accuracy determining portion
98: request determining portion
B1: first brake (first engagement device)
C1: first clutch (first engagement device)
C2: second clutch (second engagement device)
PT1: first drive-force transmitting path
PT2: second drive-force transmitting path

What is claimed is:

1. A control apparatus for a drive-force transmitting apparatus that is to be provided in a vehicle having a drive force source and drive wheels,
wherein the drive-force transmitting apparatus includes:
an input rotary member to which a drive force is to be transmitted from the drive force source;
an output rotary member from which the drive force is to be outputted to the drive wheels;
a gear mechanism configured to provide at least one gear ratio; and
a continuously-variable transmission mechanism including a primary pulley, a secondary pulley, and a transfer element that is looped over the primary and secondary pulleys,
wherein the drive-force transmitting apparatus defines a plurality of drive-force transmitting paths that are provided in parallel with each other between the input rotary member and the output rotary member,
wherein the plurality of drive-force transmitting paths include a first drive-force transmitting path through which the drive force is to be transmitted by the gear mechanism when the first drive-force transmitting path is established by a first engagement device which is provided in the first drive-force transmitting path,
wherein the plurality of drive-force transmitting paths include a second drive-force transmitting path through which the drive force is to be transmitted by the continuously-variable transmission mechanism when the second drive-force transmitting path is established by a second engagement device which is provided in the second drive-force transmitting path and which is disposed between the continuously-variable transmission mechanism and the output rotary member in the second drive-force transmitting path, and
wherein said control apparatus comprises:
an accuracy determining portion configured to determine whether there is an accuracy of detection of a rotational speed of the output rotary member or not;
a request determining portion configured to determine whether there is a lower-gear-ratio setting request requesting a target gear ratio of the continuously-variable transmission mechanism to be set to a lower gear ratio that is lower than a highest gear ratio of the continuously-variable transmission mechanism; and
a transmission shifting control portion configured, when said accuracy determining portion determines that there is not the accuracy of detection of the rotational speed of the output rotary member, to set the target gear ratio of the continuously-variable transmission mechanism to the lower gear ratio if said request determining portion determines that there is the lower-gear-ratio setting request, and to set the target gear ratio of the continuously-variable transmission mechanism to the highest gear ratio if said request determining portion determines that there is not the lower-gear-ratio setting request.

2. The control apparatus according to claim 1, wherein said accuracy determining portion determines whether there is the accuracy of detection of the rotational speed of the output rotary member, by determining whether the vehicle is being stopped or not, such that said accuracy determining portion determines that there is not the accuracy of detection of the rotational speed when determining that the vehicle is being stopped.

3. The control apparatus according to claim 2, wherein said transmission shifting control portion is configured, when the vehicle is being stopped in a neutral state of the drive-force transmitting apparatus in which both of the first and second engagement devices are released, to set the target gear ratio of the continuously-variable transmission mechanism to the lower gear ratio if said request determining portion determines that there is the lower-gear-ratio setting request, and to set the target gear ratio of the continuously-variable transmission mechanism to the highest gear ratio if said request determining portion determines that there is not the lower-gear-ratio setting request.

4. The control apparatus according to claim 3, wherein said transmission shifting control portion is configured to set the target gear ratio of the continuously-variable transmission mechanism to the highest gear ratio when the vehicle is being stopped with one of the first and second drive-force transmitting paths being established by engagement of a corresponding one the first and second engagement devices.

5. The control apparatus according to claim 1, wherein said transmission shifting control portion is configured, when said accuracy determining portion determines that there is the accuracy of detection of the rotational speed of the output rotary member, to calculate the target gear ratio of the continuously-variable transmission mechanism based on an actual value of the rotational speed of the output rotary member and a target value of a rotational speed of the input rotary member.

* * * * *